May 16, 1961

W. T. LIVERMORE ET AL 2,984,186

MULTIPLE PUMP UNIT

Filed July 11, 1957

INVENTORS
WILLIAM T. LIVERMORE
HUBERT M. CLARK

BY
Farley Forster & Farley

ATTORNEYS

May 16, 1961 — W. T. LIVERMORE ET AL — 2,984,186
MULTIPLE PUMP UNIT
Filed July 11, 1957 — 2 Sheets-Sheet 2

INVENTORS
WILLIAM T. LIVERMORE
HUBERT M. CLARK
BY Harley, Forster & Harley
ATTORNEYS

United States Patent Office 2,984,186
Patented May 16, 1961

2,984,186

MULTIPLE PUMP UNIT

William T. Livermore, Fort Lauderdale, Fla., and Hubert M. Clark, Birmingham, Mich.; said Clark assignor, by mesne assignments, to Thompson Ramo Wooldridge Inc., Cleveland, Ohio, a corporation of Ohio Filed July 11, 1957, Ser. No. 671,267

8 Claims. (Cl. 103—4)

This invention pertains to a multiple hydraulic pump unit directed to supply separate and independent pressure systems from a common reservoir and to employ common members in order to minimize size and cost of manufacture.

The invention is particularly adaptable to combining in a unitary assembly pumps of a slipper type. The embodiment shown herein is a double pump unit completely submerged in a common reservoir and is specifically designed to meet the separate and distinct hydraulic pressure requirements of motor vehicle power steering and power brake systems.

By mounting and driving the pumps in accordance with this disclosure, duplication of many of the parts and costs incident to separate pumping systems may be eliminated or reduced, and considerable space may be conserved. Further, by mounting these pumps in a common reservoir, the inlet assemblies are simplified and outlets are brought to any desired points on a single mounting head.

It is, therefore, the principal object of this invention to provide a multiple pump unit for supplying independent hydraulic pressure systems with minimum duplication of parts, minimum cost, and minimum size. Further objects include the provision of a combined power steering and power brake dual pump assembly suitable for use in motor vehicles employing a common reservoir, drive, thrust plate, outlet head, assembly means, and mounting.

These and other objects will become more apparent when a preferred embodiment of this invention is described in connection with the drawings, in which.

Figure 1:
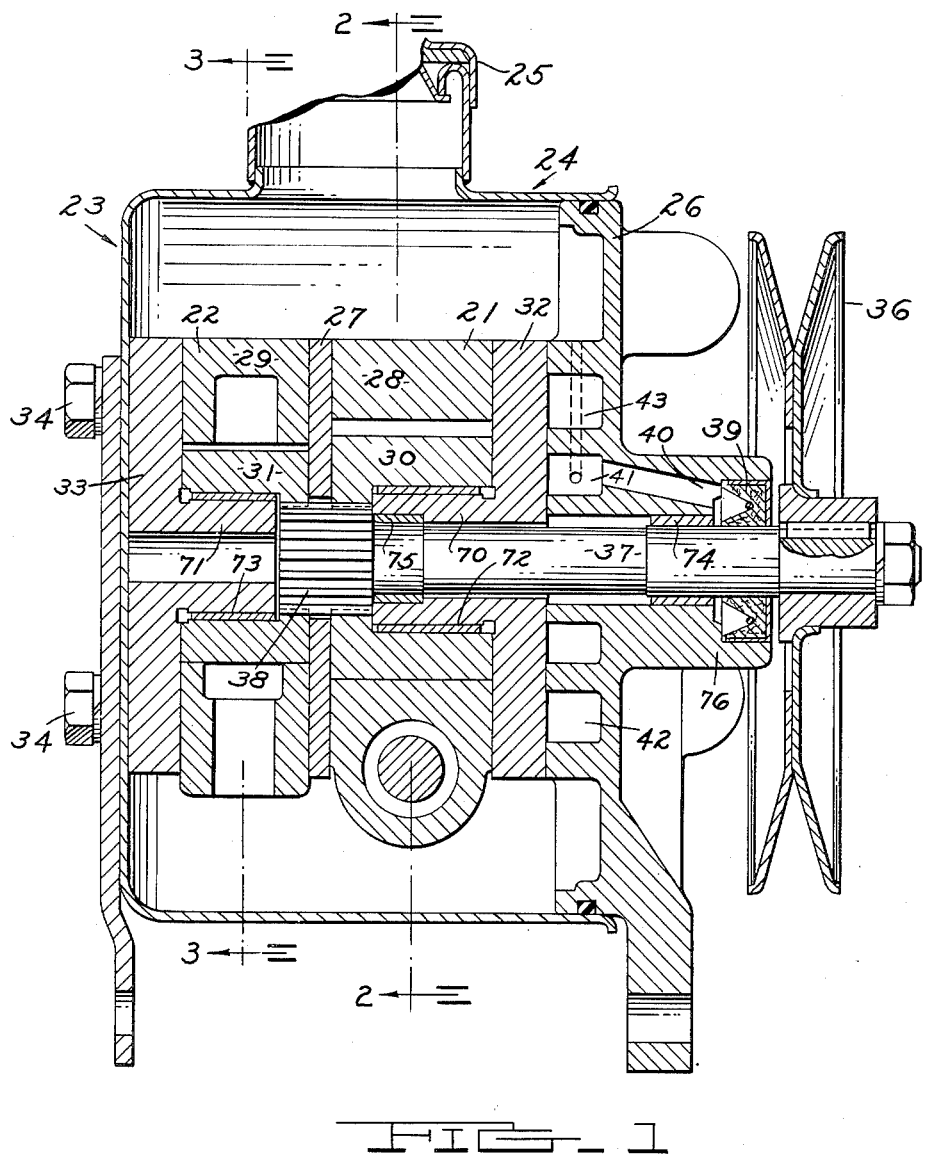
Figure 1 is a sectional elevation of a preferred multiple pump unit embodiment.

In the cross section view of Figure 1, steering pump 21 and brake pump 22 are shown mounted in reservoir 23 which has housing 24, filling cap 25 and outlet head 26 sealed to reservoir wall 24. Pumps 21 and 22 are separated by common center plate 27 and have, respectively, housings 28, 29 and rotors 30, 31. Header plates 32, 33 are located on either side of the pumps and have centrally located hubs 70, 71 supporting bearings 72, 73 on which rotors 30, 31 are mounted. Mounting bolts 34 extend and are fastened to outlet head 26 passing through header plates 32, 33, housings 28, 29 and center plate 27 clamping these members in fixed relation.

Pulley 36, adapted for V-belt drive from the vehicle engine, is keyed to common drive shaft 37 which rotates in bearings 74, 75 located respectively in a hub 76 of the outlet head and hub 70 of header plate 32. Shaft 37 terminates in an enlarged splined end 38 which drivingly engages splined ends of each of the rotors 30, 31 adjacent center plate 27. Pump leakage which serves to lubricate bearings 75, 74 is drained to reservoir by passage 40, cavity 41 and a connecting passage to reservoir, not shown, such leakage being confined by shaft bearing seal 39.

Clearance in the splined drive connection between drive shaft and rotors is made sufficient for the relatively short bearings 74 and 75 to control the axis of drive shaft 37 without any requirement for critical accuracy in the alignment of such bearings. All radial loads of rotors 30 and 31 are absorbed by bearings 72 and 73 so that torque loads alone are transmitted to the driving end of shaft 37 making possible a relatively lighter shaft design than where radial rotor loads are supported by the drive shaft and its bearings. Clearance between bearings 72, 73 and rotors 30, 31 is made sufficient so that end and center plates 32, 33, 27 establish alignment of the rotors 30, 31, and necessary tangent sealing relationship between the rotors 30, 31 and bodies 28, 29 is established by adjustment of the bodies relative to the rotors prior to dowling.

Figure 2:
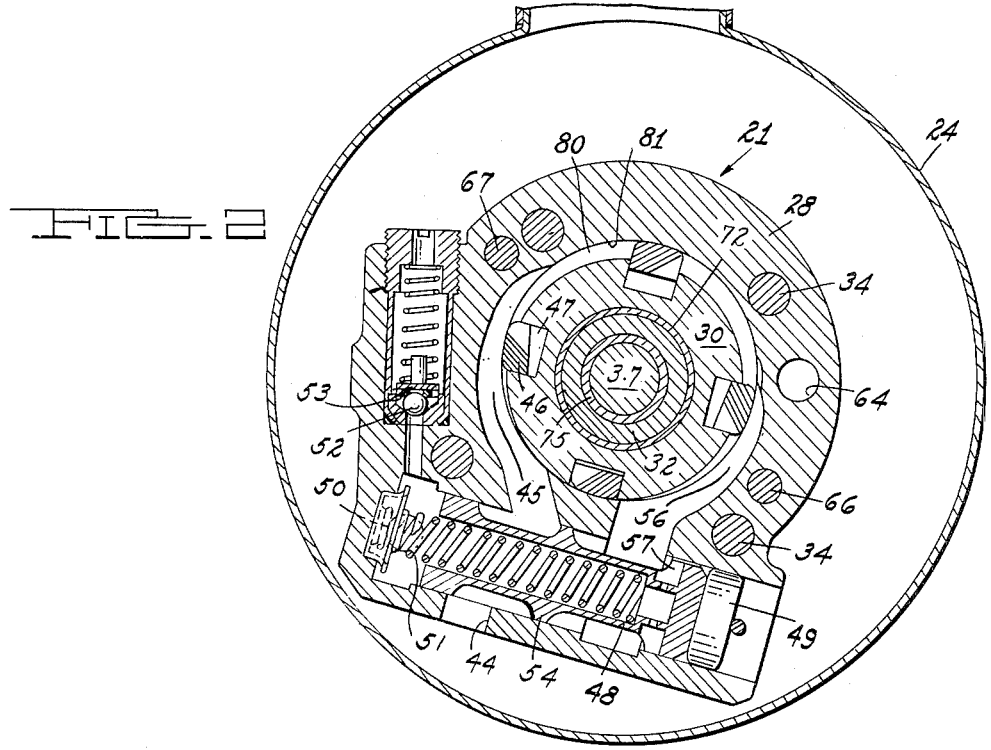
Figure 2 is a section taken along the line 2—2 of Figure 1 showing the power steering pump elements.

A cross section of pump 21 is seen in Figure 2. In general, fluid enters from reservoir at intake 44 and passes to inlet port 45 where the fluid is pumped by pumping elements comprising slippers 46 carried in notches 47 of rotor 30 through the working arc 80 of the chamber formed by bore 81 in the body 28 to outlet port 56 from which it passes through orifices 57 and the central bore in valve 48 to outlet 50 which communicates through passages, not shown, through header plate 32 and outlet head 26 to a power steering hose fitting. When the outlet pressures exceed a predetermined maximum, check valve ball 52 is lifted and relieves pressure to reservoir. Ball 52 is in contact with grooved washer 53 which prevents hunting or fluttering of the valve at maximum pressure. Valve 48 controls the flow from the pump by sensing the pressure drop across orifices 57. This pressure drop has a value increasing with flow which acts on the end of valve 48 adjacent stop 49 urging the valve against the spring 51 until land 54 is uncovered permitting direct by-pass between outlet port 56 and inlet port 45 when the flow exceeds predetermined requirements.

Figure 3:
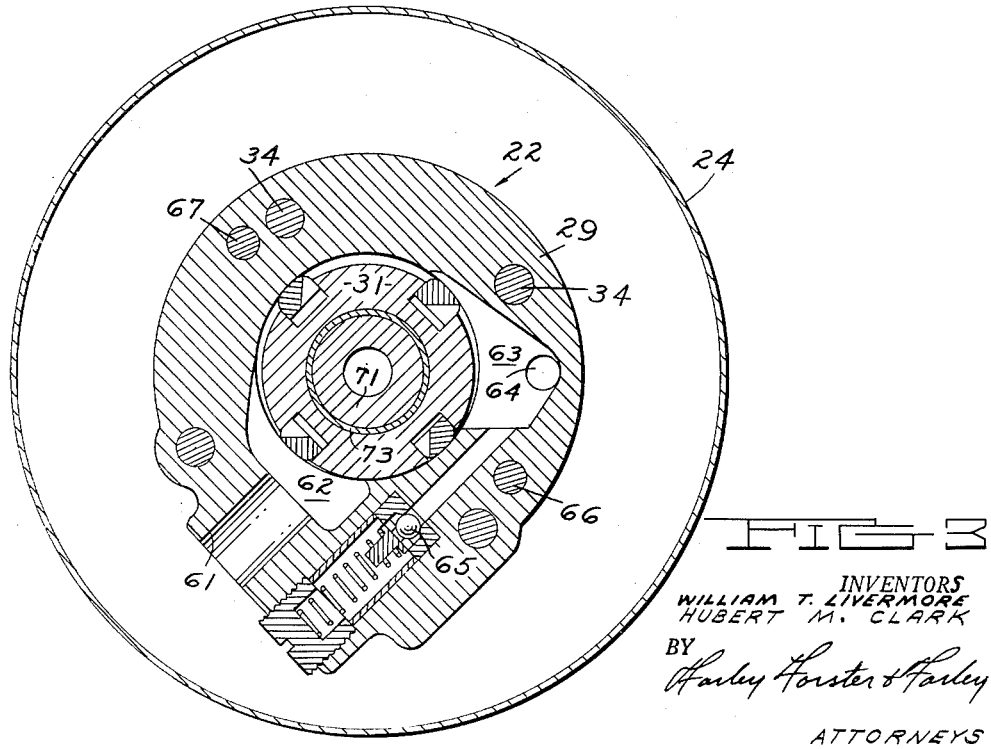
Figure 3 is a section taken at 3—3 of Figure 1 showing the power brake pump elements.

In Figure 3 is shown a cross section of a similar type slipper pump but without control valve 48. Fluid enters intake 61 from the reservoir where it feeds inlet port 62 and is pumped by slippers to outlet port 63 and outlet 64 which passes through center plate 27, body 28, header plate 32, and outlet head 26 to a power brake hose fitting. Ball check valve 65 limits the pressure to a maximum as in the pump shown in Figure 2. When pumps 21, 22 are assembled with dowel pins 66, 67, shown in cross section in both Figures 2 and 3, then outlet port 64 passing through both housings 29 and 28 and holes for bolts 34 will be properly aligned.

Referring again to Figure 1, in a preferred modification of the present pump construction, the bearing 75 may be omitted since the splined end 38 of drive shaft 37 is subject only to torsional loads from rotors 30 and 31 which have their own bearings 72, 73. By such omission the tolerances of eccentricity of bearing 75 relative to bearings 72 and 73 and of the spline to the ground portion of the drive shaft are eliminated and the spline 38 is employed for axial alignment of the drive shaft 37 with the rotors 30 and 31. Since the bearing 74 is closely adjacent the pulley 36, side loading of the drive shaft from belt tension is substantially entirely absorbed by such single bearing.

Thus it is seen that pumps 21, 22, even though supplying requirements for completely independent pressure systems, are fed from a common surrounding reservoir, are driven by a common drive shaft, are connected by common mounting bolts, have a common center plate, and have a simplified inlet and outlet system with the outlet for pump 22 passing through the housing of pump 21. It can also be seen that the space consumed by the pump and reservoir combination is very little greater than required for a single pump.

While a particular preferred embodiment of the present invention has been described above in detail, it will be understood that numerous changes might be resorted to without departing from the scope of the invention as defined in the following claims.

We claim:

1. A pump assembly comprising a fixed pump body having a bore therein defining a pump chamber, inlet and outlet ports communicating with said chamber an end plate fixed to said body having a tubular hub projecting within said bore, a pump rotor journaled on said hub having pumping elements adapted to engage said bore, said rotor and pumping elements sealingly engaging said end plate, a drive shaft passing through and concentric with said hub adapted to drivingly engage said rotor, a fixed center plate sealingly engaged by the other end of said rotor and pumping elements, a second pump mounted against said center plate having a rotor in sealing engagement therewith, said drive shaft extending through an aperture in said center plate and being also adapted to drivingly engage said second pump rotor.

2. A pump assembly comprising a fixed pump body having a bore therein defining a pump chamber, inlet and outlet ports communicating with said chamber an end plate fixed to said body having a tubular hub projecting within said bore, a pump rotor journaled on said hub having pumping elements adapted to engage said bore, said rotor and pumping elements sealingly engaging said end plate, a drive shaft passing through and concentric with said hub adapted to drivingly engage said rotor, a fixed center plate sealingly engaged by the other end of said rotor and pumping elements, a second pump mounted against said center plate having a rotor in sealing engagement therewith, said drive shaft extending through an aperture in said center plate and having a common drive spline thereon adapted to engage both of said rotors.

3. A pump assembly comprising a fixed pump body having a bore therein defining a pump chamber, inlet and outlet ports communicating with said chamber an end plate fixed to said body having a tubular hub projecting within said bore, a pump rotor journaled on said hub having pumping elements adapted to engage said bore, said rotor and pumping elements sealingly engaging said end plate, a drive shaft passing through and concentric with said hub adapted to drivingly engage said rotor, a fixed center plate sealingly engaged by the other end of said rotor and pumping elements, a second pump mounted against said center plate having a rotor in sealing engagement therewith, said drive shaft extending through an aperture in said center plate and being also adapted to drivingly engage said second pump rotor, an end plate for said second rotor having a hub providing an internal bearing surface therefor concentric with said drive shaft.

4. A pump assembly comprising a fixed pump body having a bore therein defining a pump chamber, inlet and outlet ports communicating with said chamber an end plate fixed to said body having a tubular hub projecting within said bore, a pump rotor journaled on said hub having pumping elements adapted to engage said bore, said rotor and pumping elements sealingly engaging said end plate, a drive shaft passing through and concentric with said hub adapted to drivingly engage said rotor, a fixed center plate sealingly engaged by the other end of said rotor and pumping elements, a second pump mounted against said center plate having a rotor in sealing engagement therewith, said drive shaft extending through an aperture in said center plate and being also adapted to drivingly engage said second pump rotor, an end plate for said second rotor having a hub providing an internal bearing surface therefor concentric with said drive shaft, and a second pump body fixed between said second end plate and said center plate.

5. A pump assembly comprising a fixed pump body having a bore therein defining a pump chamber, inlet and outlet ports communicating with said chamber an end plate fixed to said body having a tubular hub projecting within said bore, a pump rotor journaled on said hub having pumping elements adapted to engage said bore, said rotor and pumping elements sealingly engaging said end plate, a drive shaft passing through and concentric with said hub adapted to drivingly engage said rotor, a fixed center plate sealingly engaged by the other end of said rotor and pumping elements, a second pump mounted against said center plate having a rotor in sealing engagement therewith, said drive shaft extending through an aperture in said center plate and being also adapted to drivingly engage said second pump rotor, an end plate for said second rotor having a hub providing an internal bearing surface therefor concentric with said drive shaft, and a second pump body fixed between said second end plate and said center plate, and means for assembling said end plates, bodies and center plate together in fixed stacked relation.

6. A pump assembly comprising a fixed pump body having a bore therein defining a pump chamber, inlet and outlet ports communicating with said chamber an end plate fixed to said body having a tubular hub projecting within said bore, a pump rotor journaled on said hub having pumping elements adapted to engage said bore, said rotor and pumping elements sealingly engaging said end plate, a drive shaft passing through and concentric with said hub adapted to drivingly engage said rotor, a fixed center plate sealingly engaged by the other end of said rotor and pumping elements, a second pump mounted against said center plate having a rotor in sealing engagement therewith, said drive shaft extending through an aperture in said center plate and being also adapted to drivingly engage said second pump rotor, an end plate for said second rotor having a hub providing an internal bearing surface therefor concentric with said drive shaft, and a second pump body fixed between said second end plate and said center plate, and means for assembling said end plates, bodies and center plate together in fixed stacked relation, comprising common dowels and common bolts passing therethrough.

7. A pump assembly comprising a fixed pump body having a bore therein defining a pump chamber, inlet and outlet ports communicating with said chamber an end plate fixed to said body having a tubular hub projecting within said bore, a pump rotor journaled on said hub having pumping elements adapted to engage said bore, said rotor and pumping elements, sealingly engaging said end plate, a drive shaft passing through and concentric with said hub adapted to drivingly engage said rotor, a fixed center plate sealingly engaged by the other end of said rotor and pumping elements, a second pump mounted against said center plate having a rotor in sealing engagement therewith and having a bore defining a pump chamber, said drive shaft extending through an aperture in said center plate and being also adapted to drivingly engage said second pump rotor, an end plate for said second rotor having a hub providing an internal bearing surface therefor concentric with said drive shaft, and a second pump body fixed between said second end plate and said center plate, inlet and outlet ports communicating with said pump chambers, a common reservoir enclosing said pumps, passages leading between said reservoir and said inlet ports, a closure header at one end of said reservoir, outlets for each of said pumps in said header, and separate outlet passages from the outlet ports of each of said pumps leading to the respective header outlets.

8. A pump assembly comprising a fixed pump body having a bore therein defining a pump chamber, inlet and outlet ports communicating with said chamber an end plate fixed to said body having a tubular hub projecting within said bore, a pump rotor journaled on said hub having pumping elements adapted to engage said bore, said rotor and pumping elements sealingly engaging said end plate, a drive shaft passing through said hub, a bearing for the input end of said drive shaft seated in fixed relation to said end plate, and a splined driving connection between the output end of said drive shaft and said rotor, clearance being provided between said drive shaft and hub whereby said splined driving connection is adapted to establish the axial alignment of the output end of said drive shaft with said rotor.

References Cited in the file of this patent

UNITED STATES PATENTS

| | | |
|---|---|---|
| 1,245,691 | Deysher | Nov. 6, 1917 |
| 1,779,757 | Streckert | Oct. 28, 1930 |
| 2,377,556 | Jeannin | June 5, 1945 |
| 2,434,135 | Witchger | Jan. 6, 1948 |
| 2,511,441 | Loubiere | June 13, 1950 |
| 2,590,728 | Scognamillo | Mar. 25, 1952 |

FOREIGN PATENTS

| | | |
|---|---|---|
| 223,598 | Switzerland | May 1, 1943 |
| 1,046,702 | France | July 15, 1953 |